(12) United States Patent
Lee et al.

(10) Patent No.: US 12,418,207 B2
(45) Date of Patent: Sep. 16, 2025

(54) DEVICE FOR COOLING A MOTOR

(71) Applicants: HYUNDAI MOTOR COMPANY, Seoul (KR); KIA CORPORATION, Seoul (KR)

(72) Inventors: Won Seok Lee, Suwon-si (KR); Baek Yu Kim, Hwaseong-si (KR); Chul Min Ahn, Anyang-si (KR); Su Hyeon Maeng, Seoul (KR); Dong Hui Cheon, Hwaseong-si (KR); Sun Sung Kwon, Anyang-si (KR); Sung Gon Byun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 398 days.

(21) Appl. No.: 18/077,833

(22) Filed: Dec. 8, 2022

(65) Prior Publication Data

US 2023/0327503 A1 Oct. 12, 2023

(30) Foreign Application Priority Data

Apr. 11, 2022 (KR) .................. 10-2022-0044292

(51) Int. Cl.
*H02K 1/20* (2006.01)
*H02K 9/19* (2006.01)

(52) U.S. Cl.
CPC ............. *H02K 1/20* (2013.01); *H02K 9/19* (2013.01)

(58) Field of Classification Search
CPC .. H02K 1/20; H02K 9/00; H02K 9/12; H02K 9/19

USPC ....................... 310/52, 54, 58, 59
See application file for complete search history.

(56) References Cited

U.S. PATENT DOCUMENTS

| 8,937,414 B2 | 1/2015 | Song et al. | |
| 2007/0024129 A1* | 2/2007 | Pfannschmidt | H02K 1/20 |
| | | | 310/59 |
| 2016/0087509 A1* | 3/2016 | Rippel | H02K 15/14 |
| | | | 310/59 |

FOREIGN PATENT DOCUMENTS

| DE | 102018216300 A1 | | 3/2020 |
| JP | H0617345 U | * | 3/1994 |
| JP | 2003102147 A | * | 4/2003 |
| JP | 2018078691 A | * | 5/2018 |
| JP | 2020022232 A | * | 2/2020 |
| KR | 20200093868 A | | 8/2020 |

* cited by examiner

*Primary Examiner* — Jose A Gonzalez Quinones
(74) *Attorney, Agent, or Firm* — Lempia Summerfield Katz LLC

(57) ABSTRACT

A device for cooling a motor can improve motor cooling performance with multiple cooling channels formed in a stator core of the motor, allowing a coolant to flow in both directions therethrough. The device is capable of maximizing motor cooling performance in such a manner that two or more multiple cooling channels are formed in a stator core with a separate coolant inlet and outlet. The coolant moves in a straight line in different directions along each cooling channel to cool the stator core, and thus the temperature gradient of the coolant is minimized to cool the entire area of the motor evenly.

14 Claims, 11 Drawing Sheets

FIG. 1 – Prior Art

DEVICE FOR COOLING A MOTOR

CROSS-REFERENCE TO RELATED APPLICATION

This application claims under 35 U.S.C. § 119(a) the benefit of priority to Korean Patent Application No. 10-2022-0044292 filed on Apr. 11, 2022, the entire contents of which are incorporated herein by reference.

BACKGROUND

(a) Technical Field

The present disclosure relates to a device for cooling a motor, and more particularly, to a device for cooling a motor, in which motor cooling performance can be maximized with multiple cooling channels formed in a stator core of the motor, allowing a coolant to flow in both directions therethrough.

(b) Background Art

Generally, environment-friendly vehicles such as electric vehicles, hybrid electric vehicles, and fuel cell vehicles are equipped with drive motors. Such driver motors may be synchronous motors, induction motors, or the like as driving sources.

Typically, the motor includes a stator unit provided with stator coils wound around a stator core including a number of layered steel plates. The motor also includes a rotor unit provided with an output shaft fastened to a rotor core including a number of layered steel plates.

The motor containing the stator unit and the rotor unit generates excessive heat due to induced currents and the like that causes motor performance degradation. Thus, it is desirable that proper cooling be performed.

FIG. 1 is a schematic view showing an example of a motor cooling structure of the related art.

As shown in FIG. 1, a single cooling channel 22 configured with one coolant inlet 21 and one coolant outlet 23 is formed in a stator core 10 of the motor.

More specifically, the single cooling channel 22, which is configured with the coolant inlet 21 and the coolant outlet 23 at both end portions thereof, may be formed in an outer circumferential portion of the stator core 10 in a zigzag array.

Accordingly, cooling of the motor containing the stator core can be performed in such a manner that the coolant flows first through the coolant inlet 21, taking away heat from the stator core 10 for cooling while circulating back and forth along the single cooling channel 22. Then the coolant flows out through the coolant outlet 23.

However, the motor cooling structure of the related art has the following problems.

The single cooling channel 22 of the related art is inevitably very long as the zigzag array is adopted therewith for circulating the coolant back and forth. Consequently, the temperature of the coolant flowing into the single cooling channel 22 through the coolant inlet 21 increases gradually as the coolant moves away from the coolant inlet 21, resulting in a severe temperature gradient of the coolant within a single cooling channel 22. Thus, the motor cooling performance is degraded because the cooling of the motor is not evenly performed due to the temperature gradient of the coolant.

For further explanation, because the single cooling channel 22 of the related art is very long, when the coolant performs the motor cooling by taking away heat from the stator core 10 by circulating back and forth along the single cooling channel 22, the temperature of the coolant increases gradually as the coolant moves away from the coolant inlet 21. Thus, the cooling performance of the stator core near the coolant outlet 23 is substantially degraded compared to the cooling performance of the stator core near the coolant inlet 21. Accordingly, the motor cooling performance is reduced resulting from uneven cooling of the motor due to the temperature gradient of the coolant.

SUMMARY

The present disclosure has been made in efforts to solve the above-mentioned problems. An object of the present disclosure is to provide a device for cooling a motor, wherein the device is capable of maximizing motor cooling performance in such a manner that two or more multiple cooling channels are formed in a stator core with separate coolant inlets and outlets. Coolant moves in a straight line toward different directions along each cooling channel to cool the stator core. Thus, the temperature gradient of the coolant is minimized to cool the entire area of the motor more evenly.

To achieve the objects, according to the present disclosure, a device for cooling a motor is provided. The device includes a stator core provided with a plurality of first cooling channels and a plurality of second cooling channels formed therethrough along a leftward-rightward direction while being arranged alternately along a circumferential direction of the stator core. The device also includes first and second final core plates layered on opposed or both lateral surfaces of the stator core, respectively, with a configuration in which one coolant inlet and one coolant outlet are formed thereon. The device further includes a coolant delivery core layered between one lateral surface of the stator core and the first final core plate and between the other lateral surface of the stator core and the second final core plate. The coolant delivery core has a configuration in which all of the plurality of first cooling channels communicates with the coolant inlet of the first final core plate and the coolant outlet of the second final core plate, and in which all of the plurality of second cooling channels communicates with the coolant inlet of the second final core plate and the coolant outlet of the first final core plate.

In one example, the plurality of first cooling channels and the plurality of second cooling channels may be alternately formed with an arrangement in an identical concentric circle along a circumferential direction of the stator core.

Alternatively, the plurality of first cooling channels and the plurality of second cooling channels may be alternately formed in non-identical concentric circles along a circumferential direction of the stator core. The plurality of second cooling channels may be formed closer to an outer diameter surface of the stator core than the plurality of first cooling channels.

Particularly, the coolant delivery core may include a first core plate provided with a plurality of 1-1 communication holes corresponding to the plurality of first cooling channels, respectively, and with a plurality of 1-2 communication holes corresponding to the plurality of second cooling channels, respectively. The plurality of 1-1 communication holes and 1-2 communication holes may be formed through the first core plate along a leftward-rightward direction and arranged alternately along a circumferential direction of the first core plate. The coolant delivery core may further include a second core plate provided with a plurality of 2-1 communication holes corresponding to the plurality of 1-1 communication holes, respectively, and with a plurality of 2-2 communication holes corresponding to the plurality of 1-2 communication holes, respectively. The plurality of 2-1 communication holes and 2-2 communication holes may be formed through the second core plate along a leftward-rightward direction and arranged alternately along a circumferential direction of the second core plate. The coolant delivery core may further include a third core plate provided with: a plurality of 3-1 slots communicating with some of the plurality of 2-1 communication holes, formed to be spaced at a predetermined distance along a circumferential direction thereof; a plurality of 3-1 communication holes corresponding to some of the plurality of 2-1 communication holes, respectively, formed between the 3-1 slots; a plurality of 3-2 slots communicating with some of the plurality of 2-2 communication holes, formed to be spaced at a predetermined distance along a circumferential direction thereof; and a plurality of 3-2 communication holes corresponding to some of the 2-2 communication holes, respectively, formed between the 3-2 slots. The coolant delivery core may also include a fourth core plate provided with a plurality of 4-1 slots communicating with neighboring 3-1 slots of the plurality of 3-1 slots and also communicating with one of the plurality of 3-1 communication holes between the neighboring 3-1 slots, formed to be spaced at a predetermined distance along a circumferential direction thereof. The fourth core plate may further include a plurality of 4-2 slots communicating with neighboring 3-2 slots of the plurality of 3-2 slots and also communicating with one of the plurality of 3-2 communication holes between the neighboring 3-2 slots, formed to be spaced at a predetermined distance along a circumferential direction thereof. The first final core plate or the second final core plate is layered on an outer surface of the fourth core plate for being combined therewith.

In one example, the plurality of 1-2 communication holes may be formed longer in a radial direction than the plurality of 1-1 communication holes.

In another example, the plurality of 2-2 communication holes may be formed closer to an outer diameter surface of the second core plate than the plurality of 2-1 communication hole.

In another example, the plurality of 3-2 slots and the plurality of 3-2 communication holes may be formed closer to an outer diameter surface of the third core plate than the plurality of 3-1 slots and the plurality of 3-1 communication holes.

In another example, the plurality of 4-2 slots may be formed closer to an outer diameter surface of the fourth core plate than the plurality of 4-1 slots.

In addition, one of the plurality of 4-1 slots may communicate with a coolant inlet of the first final core plate or a coolant outlet of the second final core plate. Additionally, one of the plurality of 4-2 slots may communicate with a coolant inlet of the second final core plate or a coolant outlet of the first final core plate.

The second core plate may be adopted with an increased thickness, or the stator core may be adopted with a reduced thickness in such a manner as to adjust the moving length of the coolant by increasing the leftward-rightward lengths of the plurality of 2-1 communication holes and the plurality of 2-2 communication holes or decreasing the leftward-rightward lengths of the first cooling channel and the second cooling channel.

In addition, the coolant inlet of the first final core plate and the coolant inlet of the second final core plate may be connected with a discharge part of a cooling fluid pump for pumping the coolant supply.

In addition, the coolant inlet of the first final core plate and the coolant inlet of the second final core plate may be connected with a first coolant supply line and a second coolant supply line, respectively, which are branched and extended from the discharge part of the cooling fluid pump.

In addition, the first coolant supply line or the second coolant supply line may be equipped with an electric valve being opened or closed by a control signal of a controller.

In one example, the controller may be configured to control the electric valve to be open when an operating point of the motor is at a full load area, or a temperature of the motor is a reference temperature or higher.

Through the above configuration, the present disclosure provides the following effects.

First, by forming two or more multiple cooling channels with separate coolant inlets and outlets in the stator core, the length of the cooling channel for the cooling of the motor containing the stator core can be reduced. Thus, the temperature gradient of the coolants flowing through the cooling channels can be minimized.

Second, by forming two or more multiple cooling channels with separate coolant inlets and outlets in the stator core and allowing the coolant to move in a straight line in different directions along each cooling channel to cool the stator core, the cooling of the motor containing the stator core can be performed quickly and efficiently. Furthermore, motor cooling performance can be maximized in such a manner that the entire area of the motor is evenly cooled.

It should be understood that the terms "automotive" or "vehicular" or other similar terms as used herein are inclusive of motor vehicles in general. Such motor vehicles may encompass passenger automobiles including sports utility vehicles (SUVs), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is an automobile that has two or more sources of power, such as for example vehicles that are both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

Figure 1:
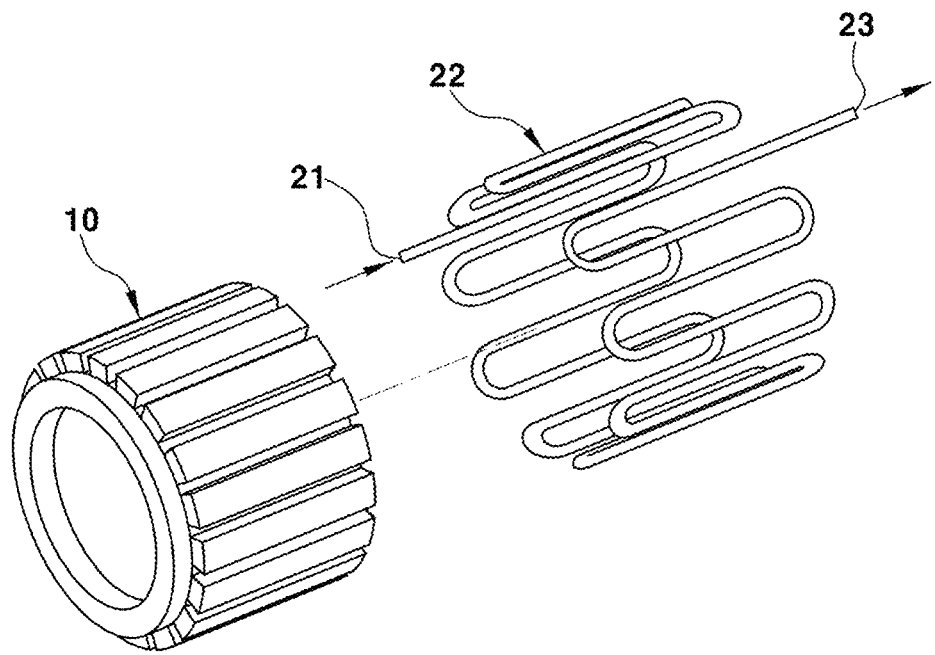
FIG. 1 is a schematic view showing an example of a motor cooling structure of the related art.

It should be understood that the appended drawings are not necessarily drawn to scale, presenting a somewhat simplified representation of various advantageous features illustrative of the basic principles of the disclosure. The specific design features of the present disclosure as disclosed herein, including, for example, specific dimensions, orientations, locations, and shapes will be determined by the particular intended application and use environment.

In the figures, reference numbers refer to the same or equivalent sections of the present disclosure throughout the several figures of the drawing.

DETAILED DESCRIPTION

It should be understood that the terms "comprise," "have," and "include," and variations thereof, when used in this specification, specify the presence of stated features, integers, steps, operations, elements, and/or components, but do not preclude the presence or addition of at least one other features, integers, steps, operations, elements, components, and/or groups thereof. When a component, device, element, or the like of the present disclosure is described as having a purpose or performing an operation, function, or the like, the component, device, or element should be considered herein as being "configured to" meet that purpose or to perform that operation or function.

It should be understood that, although the terms first, second, and the like may be used herein to describe various elements, these elements should not be limited by these terms. It should also be understood that singular forms are intended to include the plural forms as well, unless the context clearly dictates otherwise.

Hereinafter, advantageous embodiments of the present disclosure are described in detail with reference to the accompanying drawings.

Figure 2:
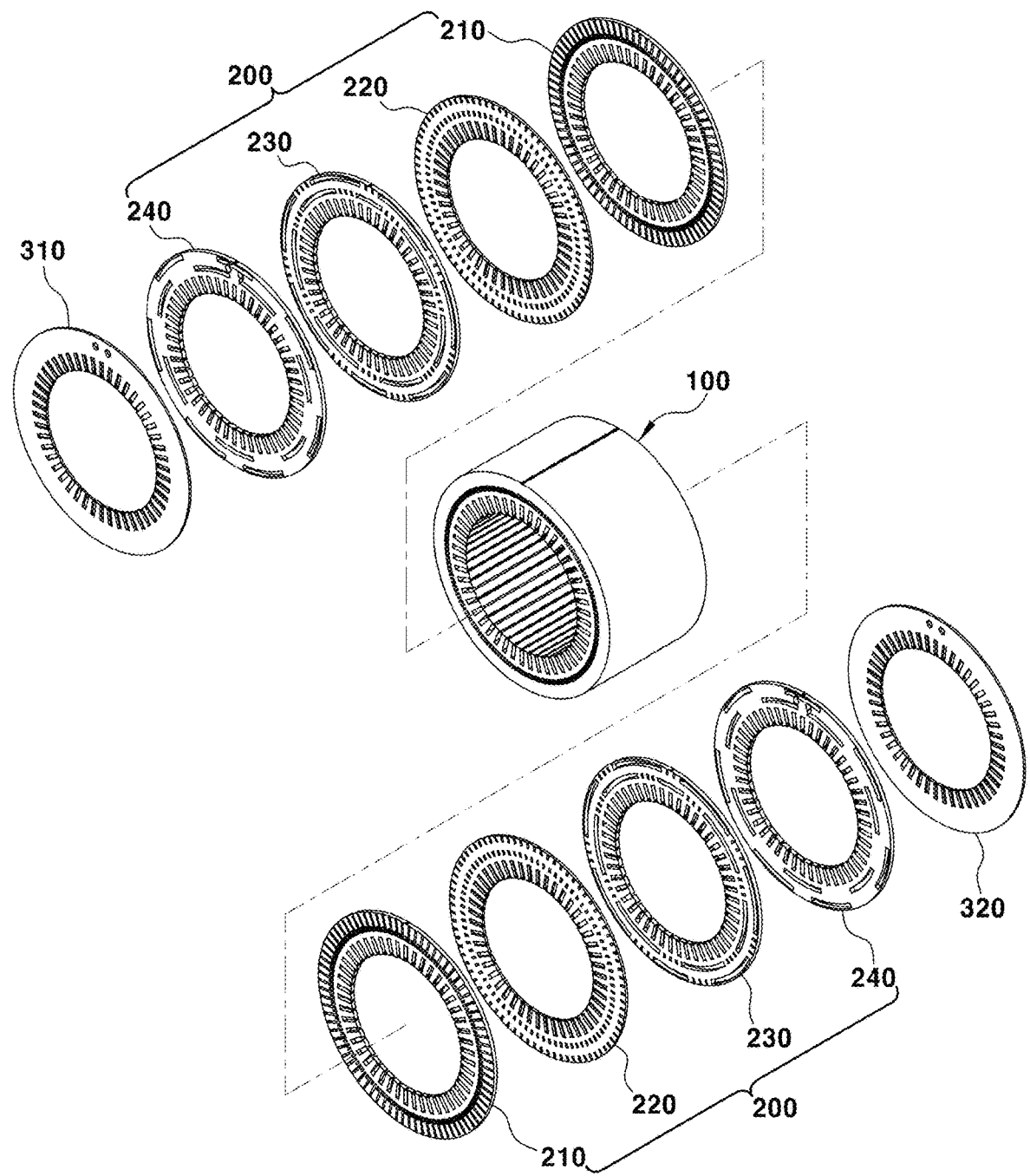
FIG. 2 is an exploded perspective view showing a device for cooling a motor according to the present disclosure.
Figure 3:
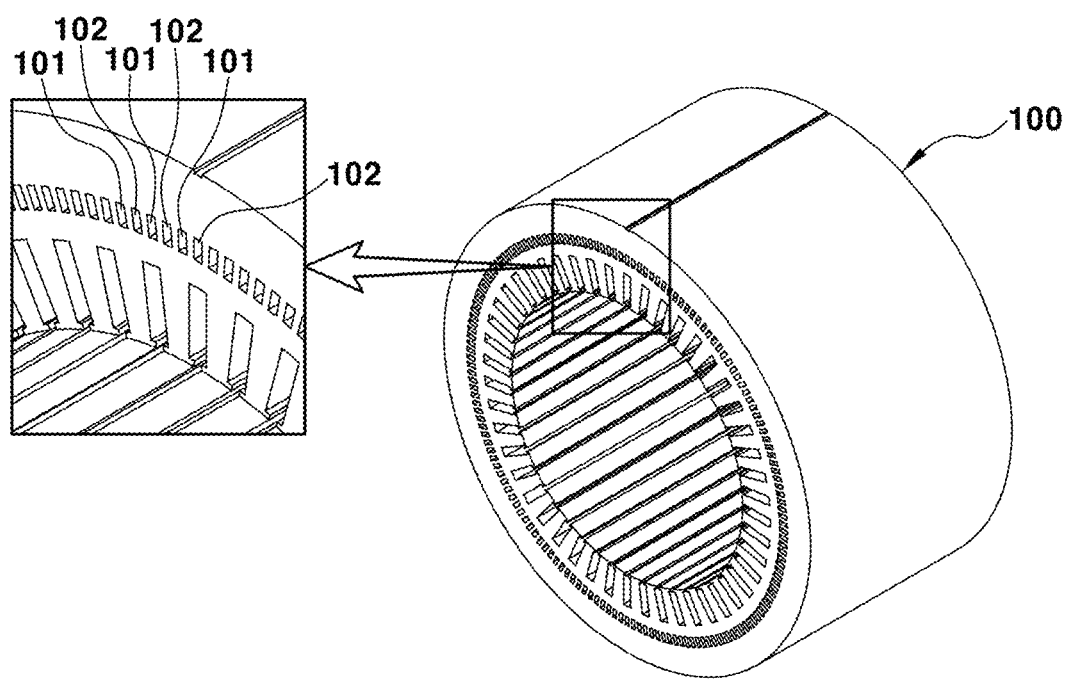
FIG. 3 is an enlarged perspective view showing an embodiment of a stator core in the configuration of the device for cooling a motor according to the present disclosure.

FIG. 2 is an exploded perspective view showing a device for cooling a motor according to the present disclosure. FIG. 3 is an enlarged perspective view showing an embodiment of a stator core in the configuration of the device for cooling a motor according to the present disclosure.

As shown in FIG. 2, coolant delivery cores 200 are layered on opposed, i.e., both sides of a stator core 100 of a motor. The coolant delivery cores 200 may have identical configurations to each other. A first final core plate 310 and a second final core plate 320 are layered on outer sides of the coolant delivery cores 200, respectively, for being combined therewith.

As shown in FIG. 3, the stator core 100 is provided with a configuration in which a plurality of first cooling channels 101 and a plurality of second cooling channels 102 are formed therethrough along a leftward-rightward direction and arranged alternately along a circumferential direction of the stator core 100.

As shown in FIG. 3, when a thickness of the stator core 100, i.e., a cooling target, in a radial direction is less than a predetermined thickness, the plurality of first cooling channels 101 and the plurality of second cooling channels 102 may be alternately formed in one identical concentric circle along the circumferential direction of the stator core 100.

Figure 9:
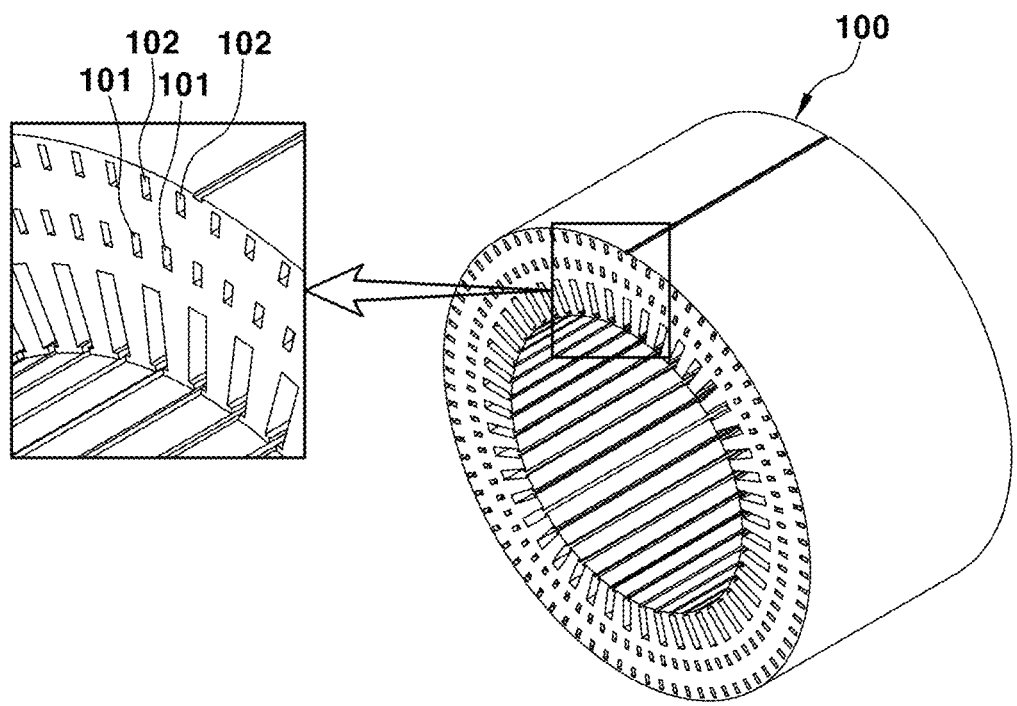
FIG. 9 is an enlarged perspective view showing another embodiment of a stator core in the configuration of the device for cooling a motor according to the present disclosure.

Alternatively, as shown in FIG. 9, when a thickness of the stator core 100, i.e., the cooling target, in a radial direction is not less (i.e., equal to or greater) than the predetermined thickness, for smooth, even cooling of the stator core 100, the plurality of first cooling channels 101 and the plurality of second cooling channels 102 may be alternately formed in non-identical concentric circles to each other along the circumferential direction of the stator core 100. Thus, the plurality of second cooling channels 102 may be formed closer to an outer diameter surface of the stator core 100 than the plurality of first cooling channels 101.

In this way, the coolant will flow in a straight line toward one direction along the first cooling channel 101 of the stator core 100, or in a straight line toward the other direction along the second cooling channel 102 of the stator core 100.

Figure 8A:
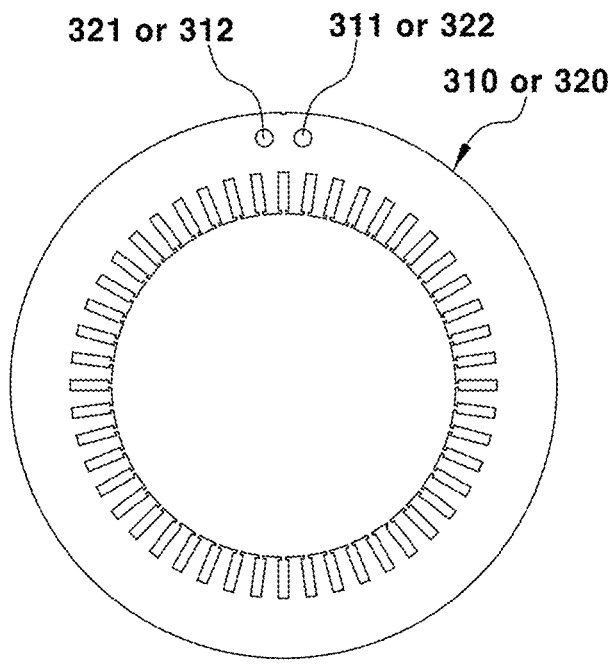
FIG. 8A is a front view showing first and second final core plates of the device for cooling a motor according to the present disclosure.

The first final core plate 310 and the second final core plate 320 are provided having identical or similar shapes to each other, and one coolant inlet and one coolant outlet are formed on each of the first and second final core plates 310, 320. For example, as shown in FIG. 8A, one first coolant inlet 311 and one second coolant outlet 312 are formed at a predetermined position through the first final core plate 310, and one first coolant outlet 321 and one second coolant inlet 322 are formed at a predetermined position through the second final core plate 320 therethrough.

The coolant delivery core 200 is layered between one lateral surface of the stator core 100 and the first final core plate 310 in such a manner as to deliver the coolant. The coolant delivery core 200 is also layered between the other lateral surface of the stator core 100 and the second final core plate 320 in such a manner as to deliver the coolant.

For this purpose, the coolant delivery core 200 is provided with a configuration in which all of the plurality of first cooling channels 101 communicate with the first coolant inlet 311 of the first final core plate 310 and the first coolant outlet 321 of the second final core plate 320. The coolant delivery core 200 is also provided with a configuration in which all of the plurality of second cooling channels 102 communicate with the second coolant inlet 322 of the second final core plate 320 and the second coolant outlet 312 of the first final core plate 310.

For further explanation, the coolant delivery core 200 is provided with a configuration in which the inflow coolant flows into one first coolant inlet 311 of the first final core plate 310 and is guided to flow through each of the plurality of first cooling channels 101 formed in the stator core 100. Furthermore, all of the outflow coolant flows from each first cooling channel 101 and is guided to flow through one first coolant outlet 321 of the second final core plate 320.

In addition, the coolant delivery core 200 is provided with a configuration in which the inflow coolant flows into one second coolant inlet 322 of the second final core plate 320 and is guided to flow through each of the plurality of second cooling channels 102 formed in the stator core 100. Furthermore, all of the outflow coolant flows from each second cooling channel 102 and is guided to flow through one second coolant outlet 312 of the first final core plate 310.

To this end, the coolant delivery core 200 may include first to fourth core plates 210, 220, 230, and 240 that are layered between one lateral surface of the stator core 100 and the first final core plate 310, and between the other lateral surface of the stator core 100 and the second final core plate 320.

Figure 4A:
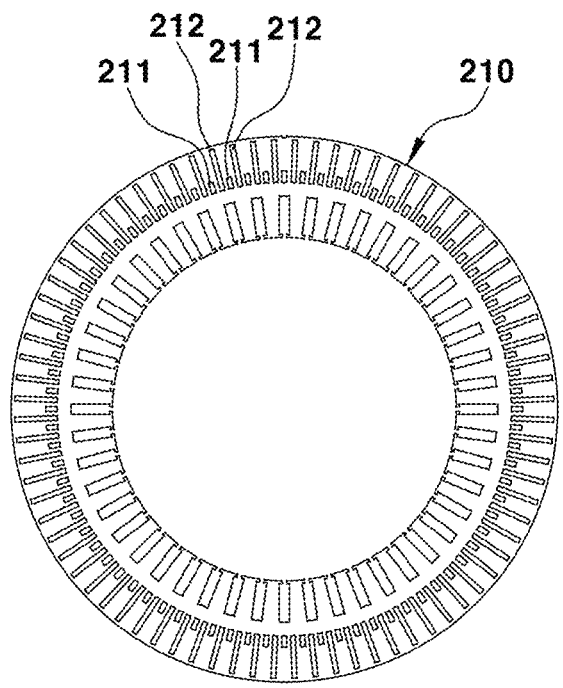
FIG. 4A is a front view showing a first core plate of the device for cooling a motor according to the present disclosure.
Figure 4B:
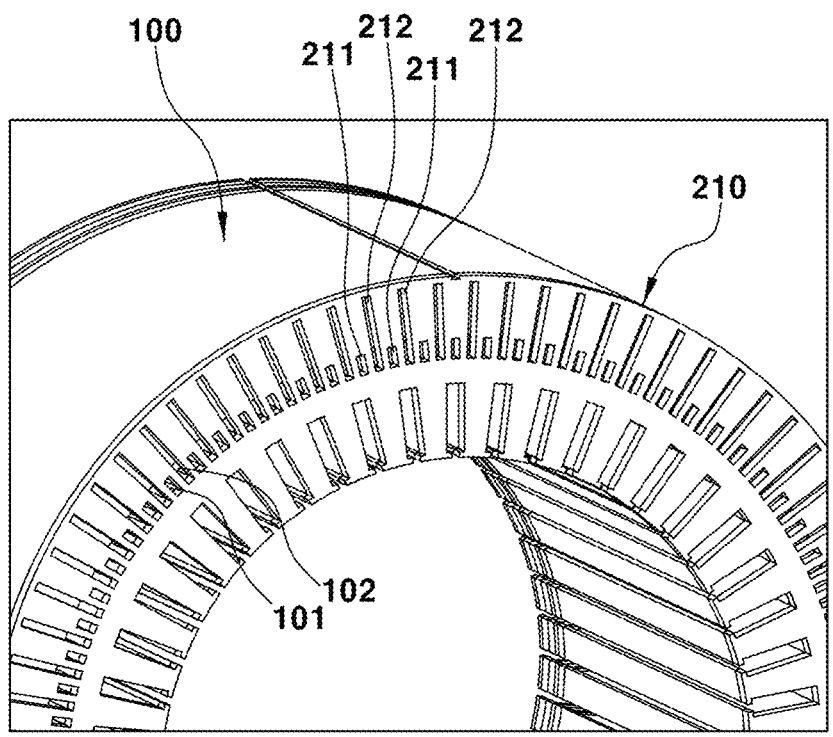
FIG. 4B is a partial enlarged perspective view showing the first core plate of the device for cooling a motor and layered on the stator core according to the present disclosure.

As shown in FIGS. 4A and 4B, the first core plate 210 may be provided with a configuration in which a plurality of 1-1 communication holes 211 correspond to the plurality of first cooling channels 101, respectively, and in which a plurality of 1-2 communication holes 212 correspond to the plurality of second cooling channels 102, respectively. The plurality of 1-1 communication holes 211 and 1-2 communication holes 212 are formed through the first core plate 210 along a leftward-rightward direction and arranged alternately along a circumferential direction of the first core plate 210.

The plurality of 1-2 communication holes 212 is formed longer in a radial direction of the first core plate 210 than the plurality of 1-1 communication holes 211.

Figure 5A:
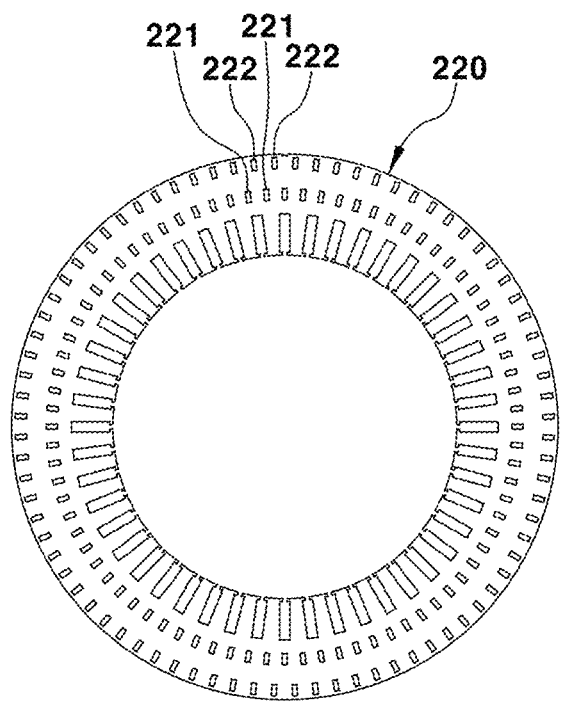
FIG. 5A is a front view showing a second core plate of the device for cooling a motor according to the present disclosure.
Figure 5B:
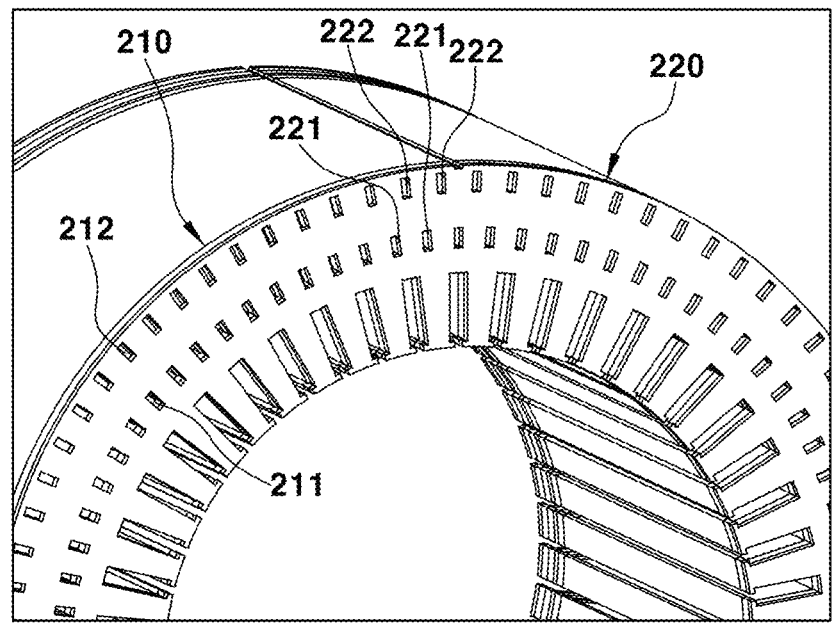
FIG. 5B is a partial enlarged perspective view showing the second core plate of the device for cooling a motor and layered on the first core plate according to the present disclosure.

As shown in FIGS. 5A and 5B, the second core plate 220 may be provided with a configuration in which a plurality of 2-1 communication holes 221 correspond to the plurality of 1-1 communication holes 211, respectively, and in which a plurality of 2-2 communication holes 222 correspond to the plurality of 1-2 communication holes 212, respectively. The plurality of 2-1 communication holes 221 and 2-2 communication holes 222 are formed through the second core plate 220 along a leftward-rightward direction and arranged alternately along a circumferential direction of the second core plate 220.

The plurality of 2-2 communication holes 222 is formed closer to an outer diameter surface of the second core plate 220 than the plurality of 2-1 communication holes 221.

Figure 6A:
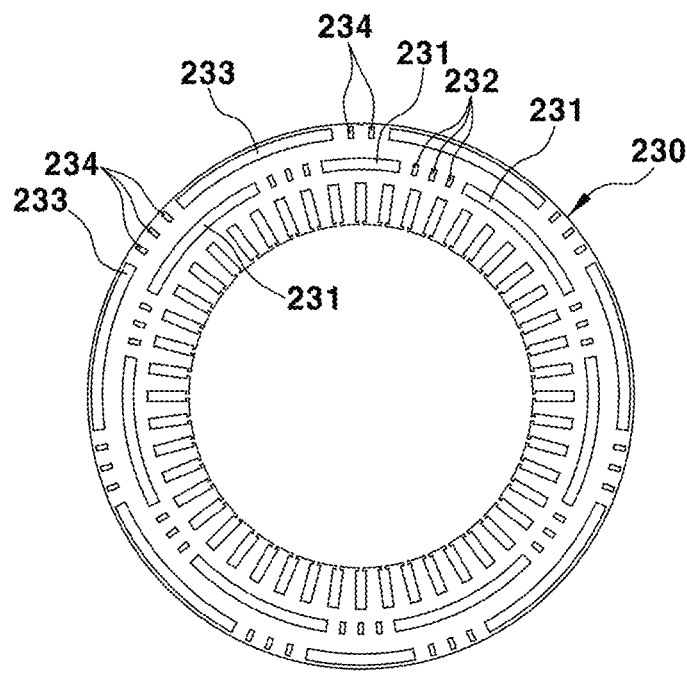
FIG. 6A is a front view showing a third core plate of the device for cooling a motor according to the present disclosure.
Figure 6B:
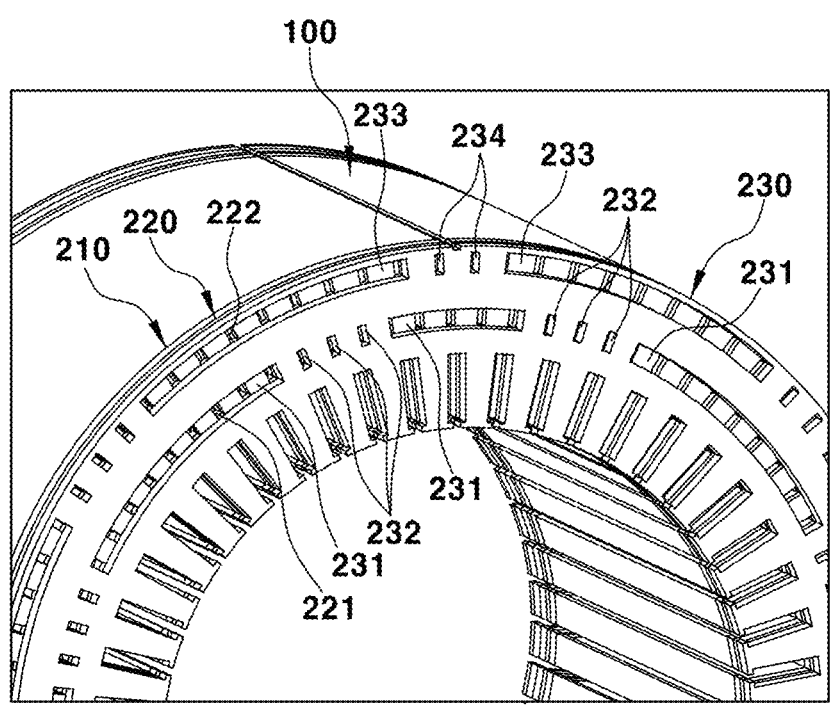
FIG. 6B is a partial enlarged perspective view showing the third core plate of the device for cooling a motor and layered on the second core plate according to the present disclosure.

As shown in FIGS. 6A and 6B, the third core plate 230 may be provided with a configuration in which a plurality of 3-1 slots 231 communicate with some of the plurality of 2-1 communication holes 221 and are formed to be spaced at a predetermined distance along a circumferential direction thereof. The third core plate 230 may be also provided with a plurality of 3-1 communication holes 232 that correspond to some of the plurality of 2-1 communication holes 221, respectively and are formed between the 3-1 slots 231. Furthermore, the third core plate 230 may be provided with a plurality of 3-2 slots 233 that communicate with some of the plurality of 2-2 communication holes 222 and are formed to be spaced at a predetermined distance along a circumferential direction thereof. Additionally, the third core plate 230 may be provided with a plurality of 3-2 communication holes 234 that correspond to some of the plurality of 2-2 communication holes 222, respectively, and are formed between the plurality of 3-2 slots 233.

The plurality of 3-1 slots 231 and 3-1 communication holes 232 are arranged with each other on one identical concentric circle, and the plurality of 3-2 slots 233 and 3-2 communication holes 234 are also arranged with each other on another identical concentric circle. Additionally, the plurality of 3-2 slots 233 and 3-2 communication holes 234 are formed closer to an outer diameter surface of the third core plate 230 than the plurality of 3-1 slots 231 and 3-1 communication holes 232.

Figure 7A:
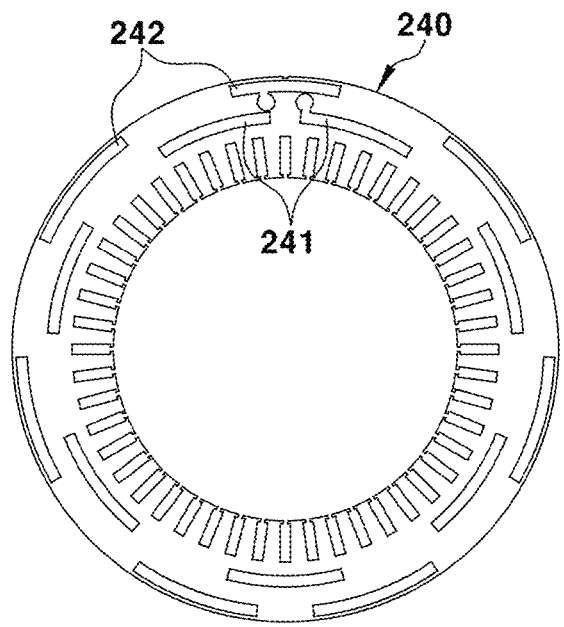
FIG. 7A is a front view showing a fourth core plate of the device for cooling a motor according to the present disclosure.
Figure 7B:
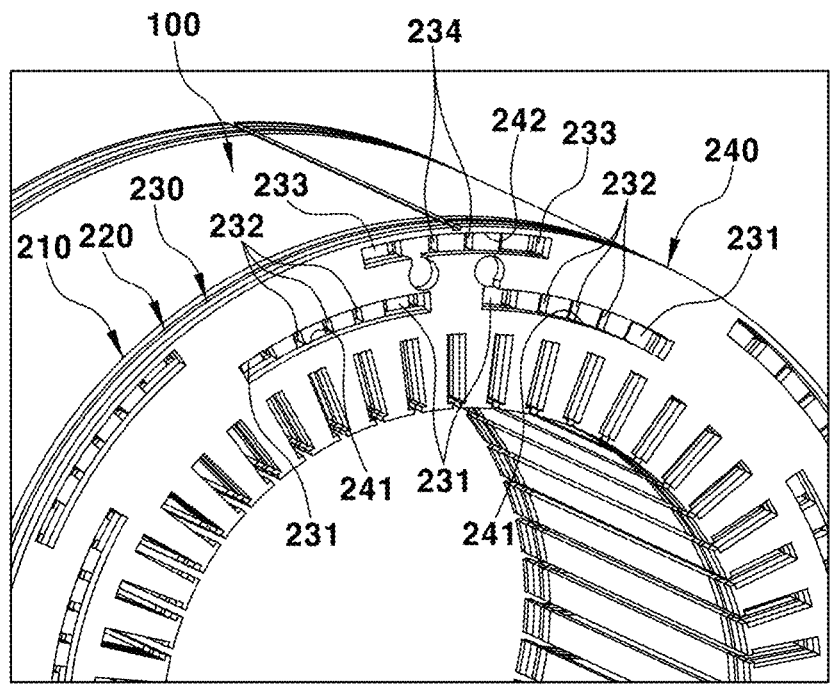
FIG. 7B is a partial enlarged perspective view showing the fourth core plate of the device for cooling a motor and layered on the third core plate according to the present disclosure.

As shown in FIGS. 7A and 7B, the fourth core plate 240 may be provided with a configuration in which a plurality of 4-1 slots 241 is formed to be spaced at a predetermined distance along a circumferential direction thereof, and a plurality of 4-2 slots 242 is formed to be spaced at a predetermined distance along a circumferential direction thereof. The plurality of 4-1 slots 241 communicates with two neighboring 3-1 slots 231 of the plurality of 3-1 slots 231 and also communicates with the 3-1 communication hole 232 disposed between the two neighboring 3-1 slots 231. Furthermore, the plurality of 4-2 slots 242 communicates with two neighboring 3-2 slots 233 of the plurality of 3-2 slots 233 and also communicates with the 3-2 communication hole 234 between the two neighboring 3-2 slots 233.

The plurality of 4-1 slots 241 is arranged on one identical concentric circle, and the plurality of 4-2 slots 242 are also arranged on another identical concentric circle. Additionally, the plurality of 4-2 slots 242 is formed closer to an outer diameter surface of the fourth core plate 240 than the plurality of 4-1 slots 241.

First to fourth core plates 210, 220, 230, and 240 are layered in order on one lateral surface and on the other opposite lateral surface of the stator core 100. The first final core plate 310 is layered on an outer surface of the fourth core plate 240 on one lateral side of the core 100 and the second final core plate 320 is layered on an outer surface on the other opposite lateral side of the fourth core plate 240 for being combined therewith.

Figure 8B:
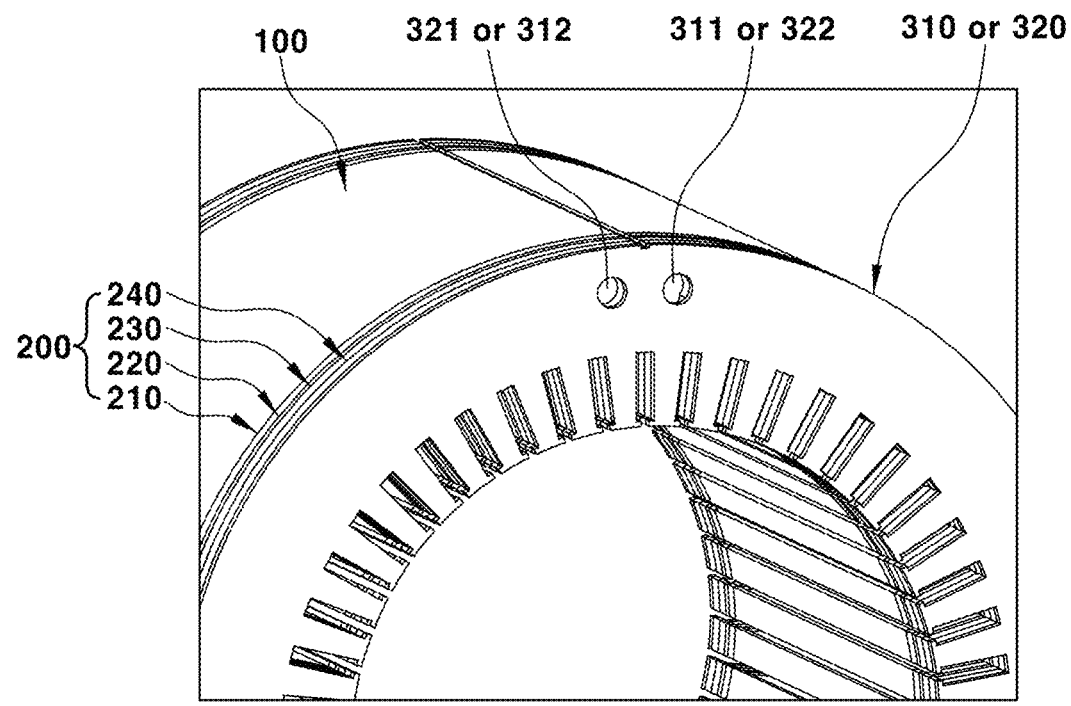
FIG. 8B is a partial enlarged perspective view showing the first and second final core plates of the device for cooling a motor layered on the fourth core plate according to the present disclosure.

In addition, as shown in FIGS. 7B and 8B, when the first final core plate 310 or the second final core plate 320 is layered on the outer surface of the fourth core plate 240 for being combined therewith, one of the plurality of 4-1 slots 241 fluidly communicates with the first coolant inlet 311 of the first final core plate 310 or the first coolant outlet 321 of the second final core plate 320. Additionally, when the first final core plate 310 or the second final core plate 320 is layered on the outer surface of the fourth core plate 240 for being combined therewith, one of the plurality of 4-2 slots 242 fluidly communicates with the second coolant inlet 322 of the second final core plate 320 or the second coolant outlet 312 of the first final core plate 310.

Figure 11:
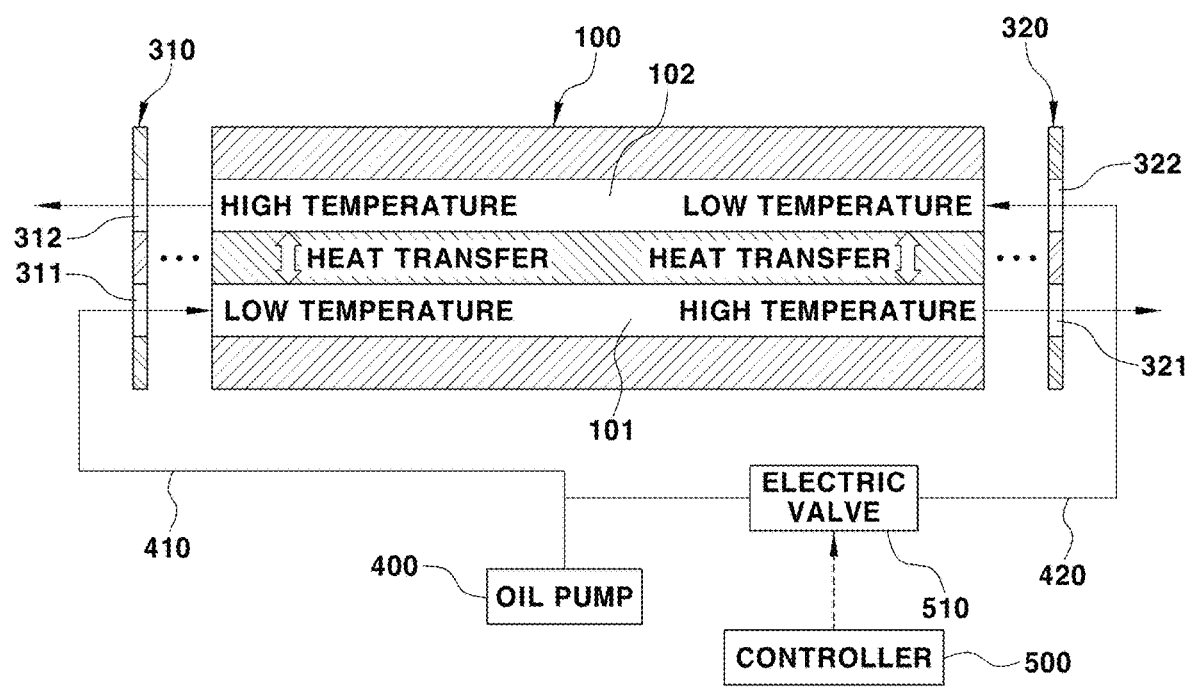
FIG. 11 is a schematic view showing an example of a cooling fluid pump and an electric valve connected to the device for cooling a motor by a coolant supply line according to the present disclosure.

As shown in FIG. 11, the first coolant inlet 311 of the first final core plate 310 and the second coolant inlet 322 of the second final core plate 320 are connected with a discharge part of a cooling fluid pump 400. The cooling fluid pump 400 supplies the coolant by pumping the coolant through the first inlet 311 of the first final core plate 310 and the second coolant inlet 322 of the second final core plate 320.

More specifically, the first coolant inlet 311 of the first final core plate 310 and the second coolant inlet 322 of the second final core plate 320 are connected with a first coolant supply line 410 and a second coolant supply line 420, respectively. The first coolant supply line 410 and the second coolant supply line 420 branch and extend from the discharge part of the cooling fluid pump 400.

In this way, the coolant (or cooling oil) may be supplied to the first coolant inlet 311 of the first final core plate 310 along the first coolant supply line 410 by the pumping drive of the cooling fluid pump 400. The coolant (or cooling oil) may also be supplied to the second coolant inlet 322 of the second final core plate 320 along the second coolant supply line 420 by the pumping drive of the cooling fluid pump 400.

In this case, an electric valve 510 that is opened or closed by a control signal of a controller 500 may be installed on the first coolant supply line 410 or the second coolant supply line 420.

The electric valve 510 that is opened or closed by a control signal of the controller 500 may only be installed on the second coolant supply line 420.

Accordingly, the electric valve 510 is normally closed, and the coolant (or cooling oil) is only supplied to the first coolant inlet 311 of the first final core plate 310 along the first coolant supply line 410 by the pumping drive of the cooling fluid pump 400.

In contrast, when the controller 500 determines that an operating point of the motor is at a full load area, or a temperature of the motor is a reference temperature or higher, the electric valve 510 is controlled to open. Thus, the coolant (or cooling oil) may be supplied to the first coolant inlet 311 of the first final core plate 310 along the first coolant supply line 410 and also to the second coolant inlet 322 of the second final core plate 320 along the second coolant supply line 420 by the pumping drive of the cooling fluid pump 400.

When a specification of the stator core varies depending on the motor type, the leftward-rightward lengths of the first cooling channel 101 and the second cooling channel 102 in the stator core 100 may vary accordingly. Thus, the motor cooling path for the coolant flow may vary and the thickness of the second core plate 220 may be increased or decreased depending on the leftward-rightward thickness of the stator core 100.

Figure 10:
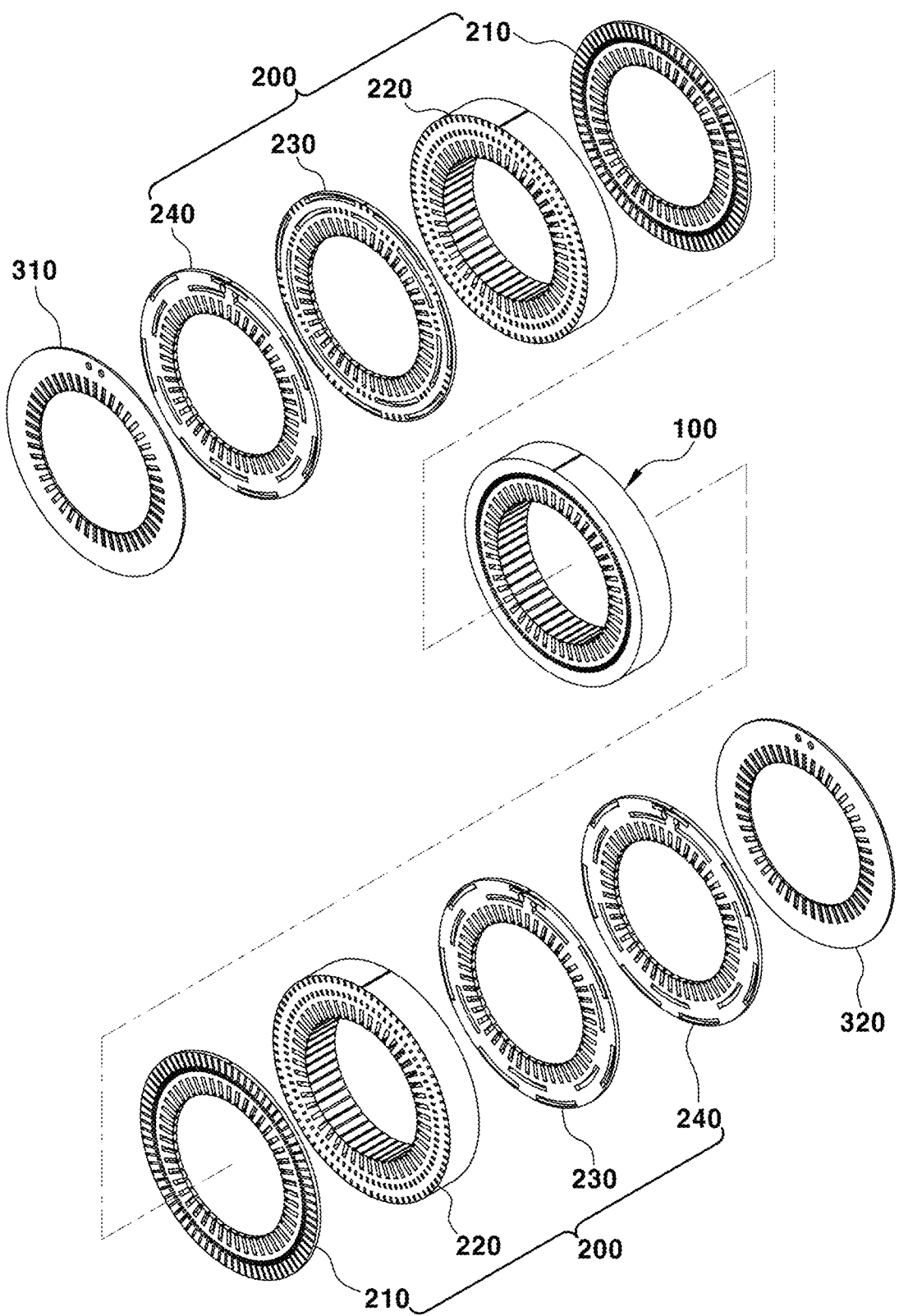
FIG. 10 is a perspective view showing an example of thickness adjustment for the stator core and the second core plate in the configuration of the device for cooling a motor according to the present disclosure.

For example, as shown in FIG. 10, considering that the motor cooling path for the coolant flow may vary, the second core plate 220 may be adopted with an increased thickness, and the stator core 100 may be adopted with a reduced thickness.

In this way, the leftward-rightward lengths of the plurality of 2-1 communication holes 221 and 2-2 communication holes 222 in the second core plate 220 may be increased by adopting the second core plate 220 with an increased thickness. Also, the leftward-rightward lengths of the first cooling channel 101 and the second cooling channel 102 in the stator core 100 may be decreased by adopting the stator core 100 with a reduced thickness. Eventually, the moving length of the coolant, as the motor cooling path for the coolant flow, may be adjusted.

The coolant flow process performed in the device for cooling a motor of the present disclosure, including the above-described configurations, is reviewed as follows.

The coolant (or cooling oil) passes through the first coolant supply line 410, the first final core plate 310, the first cooling channel 101 of the coolant delivery core 200 that is layered between the first final core plate 310 and one lateral surface of the stator core 100, and the second final core plate 320 sequentially by the pumping drive of the cooling fluid pump 400. Thus, the cooling of the motor containing the stator core 100 may be performed.

To this end, the coolant (or cooling oil) is first supplied to the first coolant inlet 311 of the first final core plate 310 along the first coolant supply line 410 by the pumping drive of the cooling fluid pump 400. Thus, the cooling of the motor containing the stator core 100 is performed while the coolant flows in a straight line toward one direction along the first cooling channel 101 formed in the stator core 100.

Also, as shown in FIGS. 7B and 8B, the coolant supplied to the first coolant inlet 311 of the first final core plate 310 may flow into one 4-1 slot 241, which communicates with the first coolant inlet 311 of the plurality of 4-1 slots 241 formed in the fourth core plate 240.

Next, the coolant that flows into the one 4-1 slot 241 may flow through the corresponding 3-1 slot 231 and 3-1 communication hole 232 of the third core plate 230.

More specifically, as shown in FIG. 7B, in addition to the one 4-1 slot 241 communicating with the first coolant inlet 311, the remaining 4-1 slots 241 communicate all at once with two neighboring 3-1 slots 231 of the plurality of 3-1 slots 231 formed in the third core plate 230 and also communicate with the 3-1 communication hole 232 between the two neighboring 3-1 slots 231. Thus, the coolant that flows into the 4-1 slot 241 may easily flow into the 3-1 slot 231 and the 3-1 communication hole 232 of the third core plate 230.

The coolant that flows into the 3-1 slot 231 and the 3-1 communication hole 232 of the third core plate 230 may successively flow into the 2-1 communication hole 221 of the second core plate 220.

More specifically, as shown in FIG. 6B, the 3-1 slot 231 of the third core plate 230 communicates all at once with some of the plurality of 2-1 communication holes 221 formed in the second core plate 220, and the 3-1 communication holes 232 of the third core plate 230 communicate one-to-one with some of the plurality of 2-1 communication holes 221 formed in the second core plate 220. Thus, the coolant that flows into the 3-1 slot 231 and the 3-1 communication hole 232 of the third core plate 230 may easily flow into each of the plurality of 2-1 communication holes 221 formed in the second core plate 220.

Then, the coolant that flows into the plurality of 2-1 communication holes 221 formed in the second core plate 220 may flow into the plurality of 1-1 communication holes 211 formed in the first core plate 210.

For further explanation, as shown in FIG. 5B, the 2-1 communication holes 221 of the second core plate 220 communicate one-to-one with the 1-1 communication holes 211 of the first core plate 210. Thus, the coolant that flows into the 2-1 communication holes 221 of the second core plate 220 may easily flow into the 1-1 communication holes 211 of the first core plate 210.

Next, the coolant that flows into the 1-1 communication holes 211 of the first core plate 210 may flow into the first cooling channel 101 of the stator core 100.

For further explanation, as shown in FIG. 4B, the 1-1 communication holes 211 of the first core plate 210 communicate one-to-one with the plurality of first cooling channels 101 formed in the stator core 100. Thus, the coolant that flows into the 1-1 communication holes 211 of the first core plate 210 may flow into the first cooling channel 101 of the stator core 100.

Therefore, the coolant that flows into the first cooling channel 101 of the stator core 100 may perform the cooling of the motor containing the stator core 100 while flowing in a straight line toward one direction.

In this way, the coolant supplied to the first coolant inlet 311 of the first final core plate 310 may perform the cooling of the motor containing the stator core 100 while flowing in a straight line toward one direction upon coming in the first cooling channel 101 of the stator core 100 after passing through the coolant delivery core 200. The coolant delivery core 200 is arranged between the first final core plate 310 and one lateral surface of the stator core 100, i.e., after passing through the fourth core plate 240, the third core plate 230, the second core plate 220, and the first core plate 210 in order.

In this case, the coolant that flows out of the first cooling channel 101 of the stator core 100, after passing through the identical coolant delivery core 200 arranged between the other lateral surface of the stator core 100 and the second final core plate 320, may be discharged through the first coolant outlet 321 of the second final core plate 320.

For further explanation, the coolant that flows out of the first cooling channel 101 of the stator core 100 may be discharged through the first coolant outlet 321 of the second final core plate 320 after passing through the first core plate 210, the second core plate 220, the third core plate 230, and the fourth core plate 240 in order. The first to fourth core plates 210, 220, 230, and 240 are arranged between the other lateral surface of the stator core 100 and the second final core plate 320. In other words, the first to fourth core plates 210, 220, 230, and 240 are in reverse order when the coolant flows through the fourth core plate 240, the third core plate 230, the second core plate 220, and the first core plate 210 in the order as described herein.

When the controller 500 determines that an operating point of the motor is at a full load area, or a temperature of the motor is at a reference temperature or higher, the electric valve 510 is controlled to open, and thus the coolant (or cooling oil) may also be supplied to the second coolant inlet 322 of the second final core plate 320 along the second coolant supply line 420 by the pumping drive of the cooling fluid pump 400.

In other words, the coolant (or cooling oil) may be supplied to the second coolant inlet 322 of the second final core plate 320 along the second coolant supply line 420 by the pumping drive of the cooling fluid pump 400. Thus, the cooling of the motor containing the stator core 100 is further performed while the coolant flows in a straight line toward the other direction along the second cooling channel 102 formed in the stator core 100.

In this way, the coolant (or cooling oil) passes through the second coolant supply line 420, the second final core plate 320, the second cooling channel 102 of the coolant delivery core 200 that is layered between the second final core plate 320 and the other lateral surface of the stator core 100, and the first final core plate 310 sequentially by the pumping drive of the cooling fluid pump 400. Thus, the cooling of the motor containing the stator core 100 may be maximized.

To this end, the coolant (or cooling oil) is first supplied to the second coolant inlet 322 of the second final core plate 320 along the second coolant supply line 420 by the pumping drive of the cooling fluid pump 400 so that the cooling of the motor containing the stator core 100 is further performed while the coolant flows in a straight line toward the other direction along the second cooling channel 102 formed in the stator core 100.

Then, as shown in FIGS. 7B and 8B, the coolant supplied to the second coolant inlet 322 of the second final core plate 320 may flow into one 4-2 slot 242, which communicates with the second coolant inlet 322 of the plurality of 4-2 slots 242 formed in the fourth core plate 240.

Next, the coolant that flows into the one 4-2 slot 242 may flow through the corresponding 3-2 slot 233 and the 3-2 communication hole 234 of the third core plate 230.

More specifically, as shown in FIG. 7B, in addition to the one 4-2 slot 242 communicating with the second coolant inlet 322, the remaining 4-2 slots 242 communicate all at once with two neighboring 3-2 slots 233 out of the plurality of 3-2 slots 233 formed in the third core plate 230 and also communicate with the 3-2 communication hole 234 between the two neighboring 3-2 slots 233. Thus, the coolant that flows into the 4-2 slot 242 may easily flow into the 3-2 slot 233 and a 3-3 communication hole 234 of the third core plate 230.

The coolant that flows into the 3-2 slots 233 and the 3-3 communication holes 234 of the third core plate 230 may successively flow into the 2-2 communication holes 222 of the second core plate 220.

More specifically, as shown in FIG. 6B, each 3-2 slot 233 of the third core plate 230 communicates all at once with some of the plurality of 2-2 communication holes 222 formed in the second core plate 220. The 3-2 communication holes 234 of the third core plate 230 communicate one-to-one with some of the plurality of 2-2 communication holes 222 formed in the second core plate 220. Thus, the coolant that flows into the 3-2 slot 233 and the 3-2 communication hole 234 of the third core plate 230 may easily flow into each of the plurality of 2-2 communication holes 222 formed in the second core plate 220. Then, the coolant that flows into the plurality of 2-2 communication holes 222 formed in the second core plate 220 may flow into the plurality of 1-2 communication holes 212 formed in the first core plate 210.

For further explanation, as shown in FIG. 5B, the 2-2 communication holes 222 of the second core plate 220 communicate one-to-one with the 1-2 communication holes 212 of the first core plate 210. Thus, the coolant that flows into the 2-2 communication holes 222 of the second core plate 220 may easily flow into the 1-2 communication holes 212 of the first core plate 210.

Next, the coolant that flows into the 1-2 communication holes 212 of the first core plate 210 may flow into the second cooling channel 102 of the stator core 100.

For further explanation, as shown in FIG. 4B, the 1-2 communication holes 212 of the first core plate 210 communicate one-to-one with the plurality of second cooling channels 102 formed in the stator core 100. Thus, the coolant that flows into the 1-2 communication holes 212 of the first core plate 210 may flow into the second cooling channel 102 of the stator core 100.

Therefore, the coolant that flows into the second cooling channel 102 of the stator core 100 may perform the cooling of the motor containing the stator core 100 while flowing in a straight line toward the other direction.

In this way, the coolant supplied to the second coolant inlet 322 of the second final core plate 320 may perform the cooling of the motor containing the stator core 100 while flowing in a straight line toward the other direction upon coming into the second cooling channel 102 of the stator core 100 after passing through the coolant delivery core 200. The coolant delivery core 200 is arranged between the second final core plate 320 and the other lateral surface of the stator core 100, i.e., after passing through the fourth core plate 240, the third core plate 230, the second core plate 220, and the first core plate 210 in order.

In this case, the coolant that flows out of the second cooling channel 102 of the stator core 100, after passing through the identical coolant delivery core 200 arranged between one lateral surface of the stator core 100 and the first final core plate 310, may be discharged through the second coolant outlet 312 of the first final core plate 310.

For further explanation, the coolant that flows out of the second cooling channel 102 of the stator core 100 may be discharged through the second coolant outlet 312 of the first final core plate 310 after passing through the first core plate 210, the second core plate 220, the third core plate 230, and the fourth core plate 240 in order. The first to fourth core plates 210, 220, 230, and 240 are arranged between one lateral surface of the stator core 100 and the first final core plate 310, i.e., in reverse order when the coolant flows through the fourth core plate 240, the third core plate 230, the second core plate 220, and the first core plate 210 in order as described herein.

In this way, when the controller 500 determines that an operating point of the motor is at a full load area, or a temperature of the motor is a reference temperature or higher, the electric valve 510 is controlled to open. This enables the coolant (or cooling oil) to cool the stator core by the pumping drive of the cooling fluid pump 400 while the coolant flows in a straight line toward one side along the first cooling channel 101 of the stator core 100 and also flows in a straight line toward the other side along the second cooling channel 102 at the same time. Thus, the motor cooling can be maximized.

Furthermore, referring to FIG. 11, the inflow coolant into the first cooling channel 101 of the stator core 100 through the first coolant inlet 311 of the first final core plate 310 is in a low-temperature state, and the outflow coolant from the second cooling channel 102 of the stator core 100 through the first coolant outlet 312 of the first final core plate 320 is in a high-temperature state. Thus, the temperature gradient of the coolant flowing through each of the cooling channels 101 and 102 can be minimized by the heat transfer between the low-temperature coolant flowing through the first cooling channel 101 and the high-temperature coolant flowing through the second cooling channel 102.

Likewise, as shown in FIG. 11, the inflow coolant into the second cooling channel 102 of the stator core 100 through the second coolant inlet 322 of the second final core plate 320 is in a low-temperature state, and the outflow coolant from the first cooling channel 101 of the stator core 100 through the second coolant outlet 321 of the second final core plate 320 is in a high-temperature state. Thus, the temperature gradient of the coolants flowing through each of the cooling channels 101 and 102 can be minimized by the heat transfer between the low-temperature coolant flowing through the second cooling channel 102 and the high-temperature coolant flowing through the first cooling channel 101.

As described above, two or more multiple cooling channels 101 and 102 with separate coolant inlets and outlets are formed in the stator core 100 to reduce the length of the cooling channel for the cooling of the motor containing the stator core 100. Thus, the temperature gradient of the coolants flowing through the cooling channels can be minimized.

In addition, two or more multiple cooling channels 101 and 102 are formed in the stator core 100 with separate coolant inlets and outlets, allowing the coolant to move along each cooling channel in a straight line in different directions to cool the stator core 100. Thus, the cooling of the motor containing the stator core can be performed quickly and efficiently, and motor cooling performance can be maximized in such a manner that the entire area of the motor is evenly cooled and the like.

While various embodiments of the present disclosure have been described herein in detail, the scope of the present disclosure is not limited to each of the described embodiments. Furthermore, various modifications and improvements by those having ordinary skill in the art, using the basic concept of the present disclosure defined in the appended claims, are also included in the scope of the present disclosure.

What is claimed is:

1. A device for cooling a motor, the device comprising:
a stator core with a plurality of first cooling channels and a plurality of second cooling channels formed therethrough along an axial direction and arranged alternately along a circumferential direction of the stator core; and
first and second final core plates layered, respectively, on opposed lateral surfaces of the stator core, each having a configuration of one coolant inlet and one coolant outlet formed therein;
wherein the stator core includes a first coolant delivery core disposed on a left side thereof and capped with the first final core plate and a second coolant delivery core disposed on a right side thereof and capped with the second final core plate,
wherein the plurality of first cooling channels all communicates between a coolant inlet of the first final core plate and a coolant outlet of the second final core plate, and the plurality of second cooling channels all communicate between a coolant inlet of the second final core plate and a coolant outlet of the first final core plate,
wherein each of the first coolant delivery core and the second coolant delivery core comprises:
a first core plate provided with a plurality of 1-1 communication holes corresponding to the plurality of first cooling channels, respectively, and a plurality of 1-2 communication holes corresponding to the plurality of second cooling channels, respectively, formed therethrough along a leftward-rightward direction while being arranged alternately along a circumferential direction of the first core plate;
a second core plate provided with a plurality of 2-1 communication holes corresponding to the plurality of 1-1 communication holes, respectively, and with a plurality of 2-2 communication holes corresponding to the plurality of 1-2 communication holes, respectively, formed therethrough along a leftward-rightward direction while being arranged alternately along a circumferential direction of the second core plate;
a third core plate provided with a plurality of 3-1 slots communicating with some of the plurality of 2-1 communication holes, formed to be spaced at a predetermined distance along a circumferential direction thereof, 3-1 communication holes corresponding to some of the plurality of 2-1 communication holes, respectively, formed between the 3-1 slots, a plurality of 3-2 slots communicating with some of the plurality of 2-2 communication holes, formed to be spaced at a predetermined distance along a circumferential direction thereof, and 3-2 communication holes corresponding to some of the 2-2 communication holes, respectively, formed between the 3-2 slots; and a fourth core plate provided with a plurality of 4-1 slots communicating with neighboring 3-1 slots of the plurality of 3-1 slots and also communicating with a 3-1 communication hole between the neighboring 3-1 slots, formed to be spaced at a predetermined distance along a circumferential direction thereof, and a plurality of 4-2 slots communicating with neighboring 3-2 slots of the plurality of 3-2 slots and also communicating with a 3-2 communication hole between the neighboring 3-2 slots, formed to be spaced at a predetermined distance along a circumferential direction thereof, wherein the first final core plate or the second final core plate is layered on an outer surface of the fourth core plate for being combined therewith.

2. The device of claim 1, wherein the plurality of first cooling channels and the plurality of second cooling channels are arranged alternately in identical concentric circles along a circumferential direction of the stator core.

3. The device of claim 1, wherein the plurality of first cooling channels and the plurality of second cooling channels are arranged alternately in non-identical concentric circles along a circumferential direction of the stator core.

4. The device of claim 3, wherein the plurality of second cooling channels is formed closer to an outer diameter surface of the stator core than the plurality of first cooling channels.

5. The device of claim 1, wherein each of the plurality of 1-2 communication holes has an opening with a diameter, in a radial direction, larger than that of each of the plurality of 1-1 communication holes.

6. The device of claim 1, wherein the plurality of 2-2 communication holes is formed closer to an outer diameter surface of the second core plate than the plurality of 2-1 communication holes.

7. The device of claim 1, wherein each 3-2 slot of the plurality of 3-2 slots and the 3-2 communication holes are formed closer to an outer diameter surface of the third core plate than the 3-1 slot and the 3-1 communication holes.

8. The device of claim 1, wherein each 4-2 slot of the plurality of 4-2 slots is formed closer to an outer diameter surface of the fourth core plate than the plurality of 4-1 slots.

9. The device of claim 1, wherein one of the plurality of 4-1 slots communicates with a coolant inlet of a first final core plate or a coolant outlet of a second final core plate, and one of the plurality of 4-2 slots communicates with a coolant inlet of the second final core plate or a coolant outlet of the first final core plate.

10. The device of claim 1, wherein the second core plate has an increased thickness, or the stator core has a reduced thickness to adjust a flow length of the coolant by increasing leftward-rightward lengths of the plurality of 2-1 communication holes and 2-2 communication holes or decreasing leftward-rightward lengths of the first cooling channel and the second cooling channel.

11. The device of claim 1, wherein the coolant inlet of the first final core plate and the coolant inlet of the second final core plate are connected with a discharge part of a cooling fluid pump configured to pump the coolant to supply the coolant to the stator core.

12. The device of claim 11, wherein the coolant inlet of the first final core plate and the coolant inlet of the second final core plate are connected with a first coolant supply line and a second coolant supply line, respectively, which branch and extend from the discharge part of the cooling fluid pump.

13. The device of claim 12, wherein the first coolant supply line or the second coolant supply line is equipped with an electric valve configured to be opened or closed by a control signal of a controller.

14. The device of claim 13, wherein the controller is configured to control the electric valve to be open when an operating point of the motor is at a full load area, or a temperature of the motor is a reference temperature or higher.

* * * * *